Oct. 14, 1952 E. R. MAURER 2,613,783
SYNCHRONIZED CENTRIFUGAL PAWL CLUTCH
Original Filed Feb. 19, 1945 3 Sheets-Sheet 1

INVENTOR.
Edwin R. Maurer.
BY Harness & Harris
ATTORNEYS.

Oct. 14, 1952  E. R. MAURER  2,613,783
SYNCHRONIZED CENTRIFUGAL PAWL CLUTCH
Original Filed Feb. 19, 1945  3 Sheets-Sheet 2
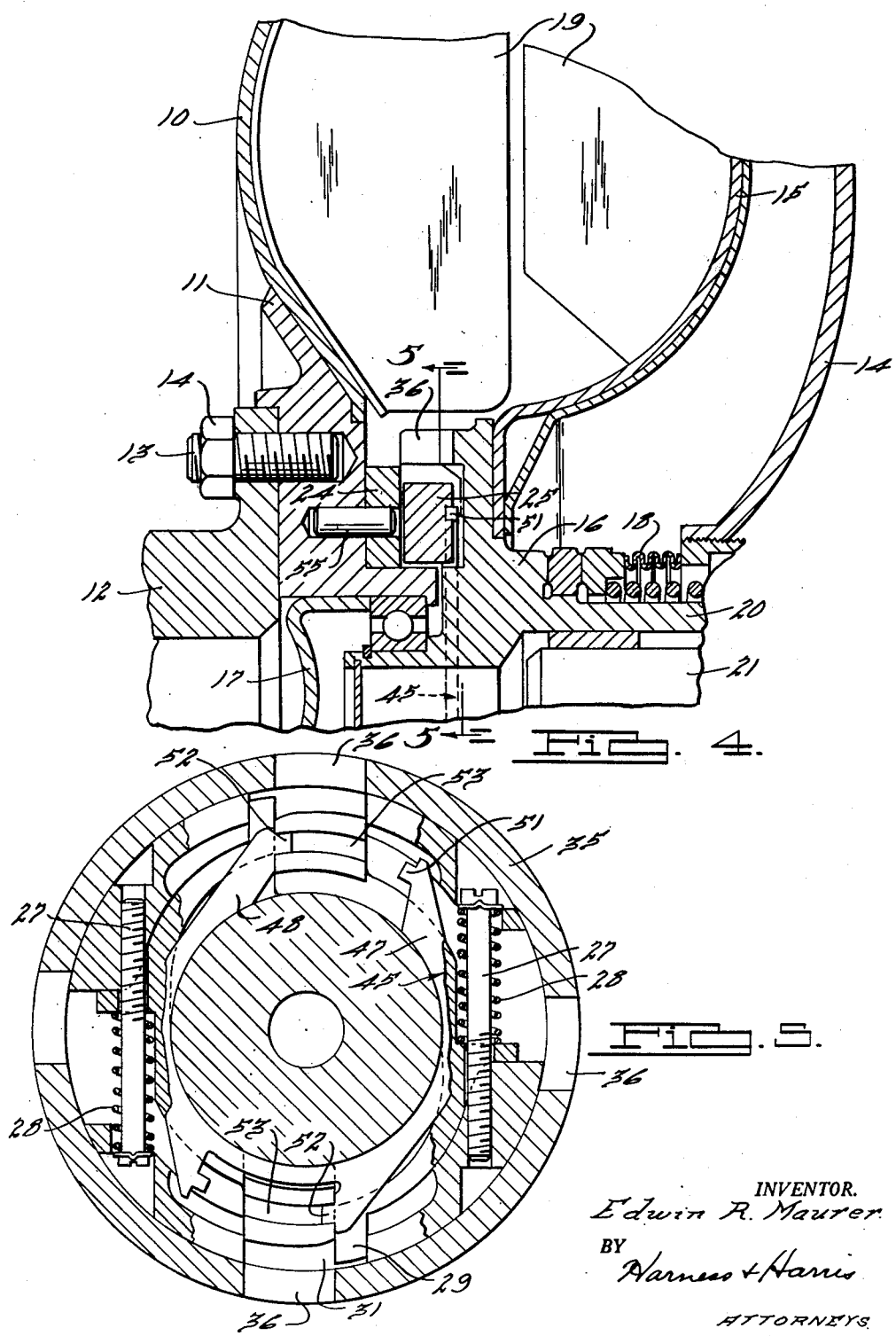
INVENTOR.
Edwin R. Maurer
BY
Harness + Harris
ATTORNEYS Oct. 14, 1952     E. R. MAURER     2,613,783
SYNCHRONIZED CENTRIFUGAL PAWL CLUTCH Original Filed Feb. 19, 1945     3 Sheets-Sheet 3

INVENTOR.
Edwin R. Maurer.
BY
Harness Harris
ATTORNEYS.

Patented Oct. 14, 1952

2,613,783

UNITED STATES PATENT OFFICE 2,613,783

SYNCHRONIZED CENTRIFUGAL PAWL CLUTCH

Edwin R. Maurer, Detroit, Mich., assignor to Chrysler Corporation, Highland Park, Mich., a corporation of Delaware Original application February 19, 1945, Serial No. 578,631. Divided and this application July 24, 1948, Serial No. 40,568

8 Claims. (Cl. 192—105)

This invention relates to power transmitting drives providing a pawl clutch of the centrifugal type engageable to drivingly connect a driving and a driven member. More particularly my invention has reference to centrifugal pawl clutch mechanism providing means for controlling the pawl engagement, for example, whereby it may be made operably responsive to certain predetermined conditions of operation of the drive structure with which the clutch mechanism is associated. The present application is a division of my copending application Serial No. 578,631 filed February 19, 1945, now Patent No. 2,448,539.

My invention will be illustrated as applied to a centrifugally actuated pawl clutch mechanism for locking together against slip under certain conditions of vehicle operation a pair of fluid power transmitting elements, which clutch mechanism includes a driving member drivingly associated with one of said power transmitting elements, a driven member drivingly associated with the other of the power transmitting elements, a locking pawl carried by one of the members and operably responsive to centrifugal force upon predetermined rotation of said one member for interconnecting said clutch elements and means for preventing the operation of the clutch mechanism for positively locking together the fluid power transmitting elements until the rotative speeds of the clutch members have been first brought to approximate synchronism.

An object of the invention therefore, is to provide an automatically operable clutch mechanism with means operable in response to functioning of the power transmitting drive structure in which the clutch mechanism is incorporated for controlling engagement of the clutch mechanism.

Another object is to provide a centrifugal type pawl clutch mechanism for an automotive vehicle drive structure with blocker means operable automatically under certain conditions of vehicle functioning for positively preventing engagement of the pawl.

A more particular object is the provision of control means aforesaid in the nature of a frictionally driven balk ring provided with a pair of circumferentially spaced fingers for interlocking with the pawl member under certain conditions of operation to prevent engagement with its pawl receiving shell, one finger providing the locking function under drive conditions, the other under coast conditions of operation.

Other objects of my invention will be apparent from the following description and the drawings wherein:

Figs. 4 and 5 are views similar to those of Figs. 1 and 2 of a modified form of the invention;

Figures 1, 2, 3:
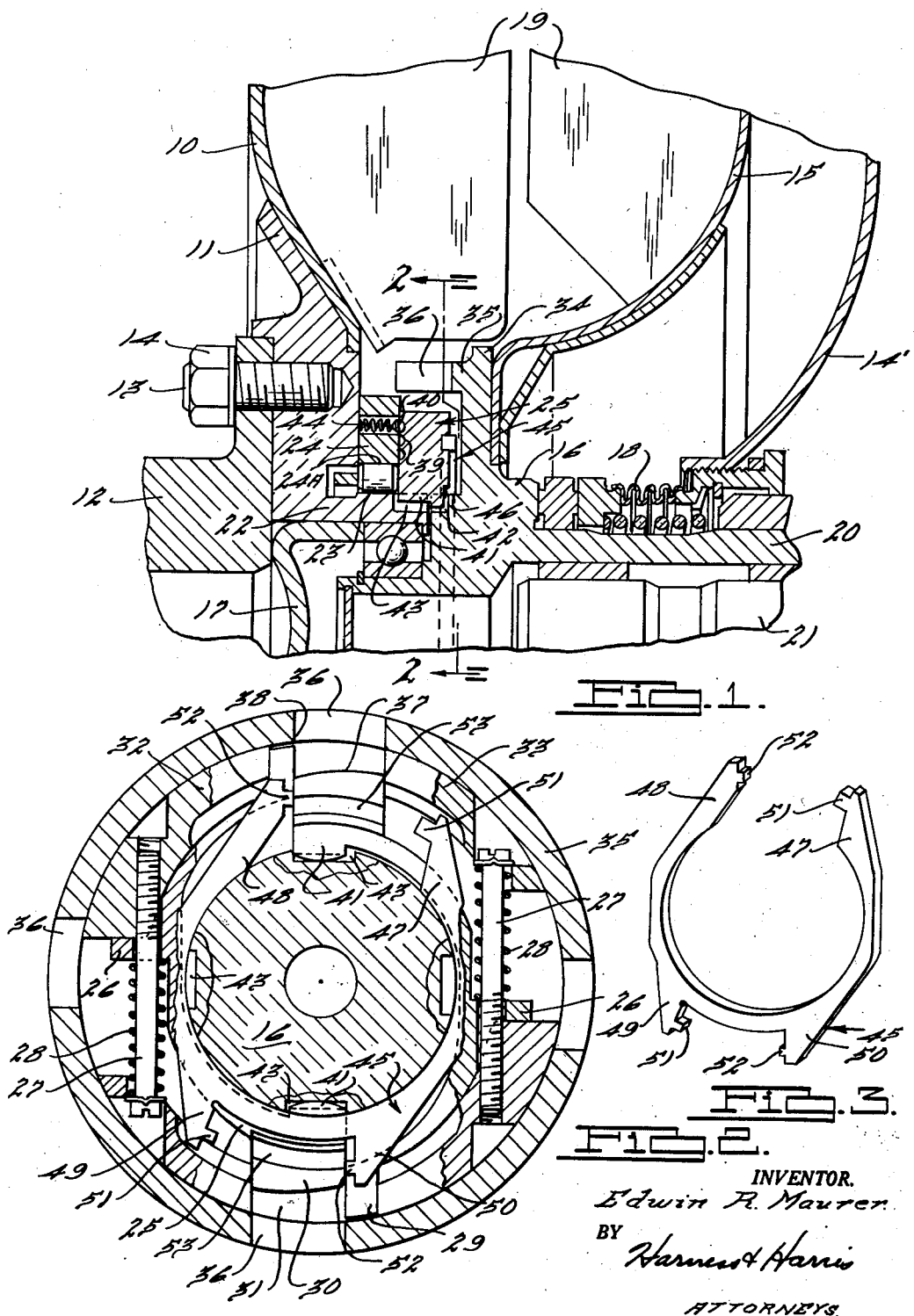
Fig. 1 is a sectional elevation of a portion of a transmission embodying the present invention.
Fig. 2 is a sectional view taken along the line 2—2 of Fig. 1.
Fig. 3 is an elevational view of the control ring of my invention shown in perspective.
Figure 6:
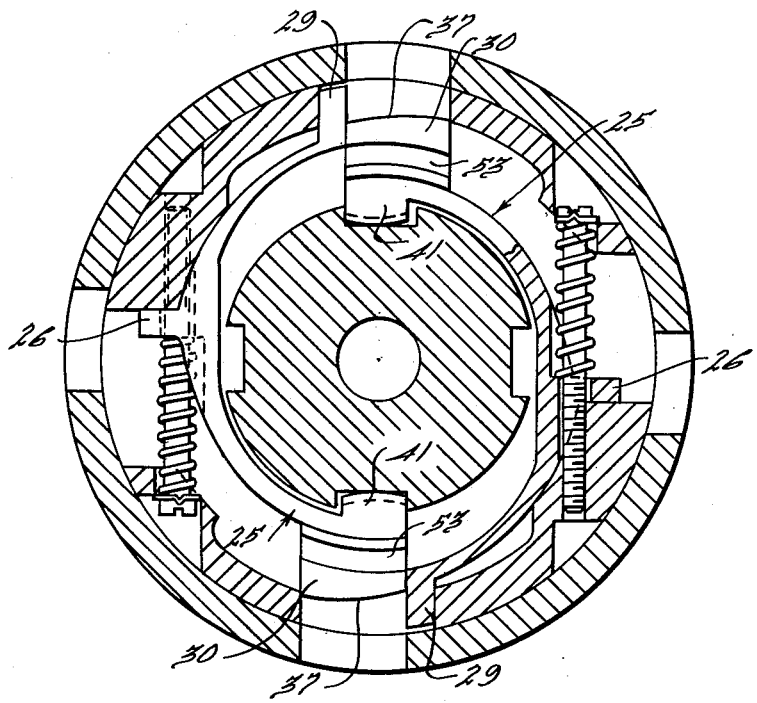
Figure 6 is a sectional view similar to that of Figure 2 omitting the pawl balking member.
Figure 7:
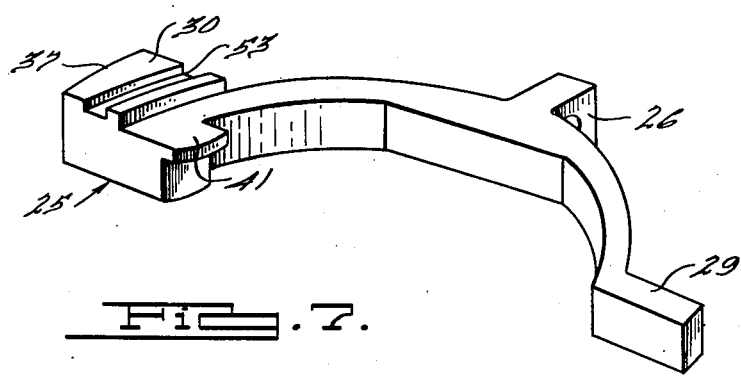
Figure 7 is a perspective view of one of the pawls of Figure 6.

Referring to Figs. 1 to 5, it will be seen that there is illustrated a fluid power transmitting device such as a fluid coupling having an impeller 10 carried by a hub 11 which is fastened to an engine crankshaft 12 by means of studs 13 and nuts 14. The impeller includes a housing portion 14' which encloses a runner 15, the latter being welded or otherwise fastened to a hub 16. A forward seal 17 and a rear seal 18 prevent leakage of the fluid which is circulated in the passages formed by the vanes 19, as is conventional in the art. The runner hub 16 has a tubular portion as at 20 by which drive is imparted to the input member of the vehicle transmission. This tubular portion, as shown, also pilots a transmission drive shaft 21.

The impeller hub 11 in Fig. 1 has an inwardly projecting annular portion 22 on which is formed a series of cams. These cams form one element of a roller clutch having rollers 23. The other element of the clutch is formed by a pawl drive plate or member 24 which has an inner cylindrical surface 24<sup>A</sup> in engagement with the rollers 23 and carries a pair of centrifugally actuated pawls 25. The pawls are an element of a centrifugal clutch and have ears 26 for loosely engaging bolts 27. The bolts 27 are rigidly carried in the pawl drive plate 24, as shown, and mount a coil compression spring 28 which tends to keep the pawls 25 in retracted, that is, disengaged position. The pawls are shaped as illustrated and each has an integral tail portion 29 which lies alongside the engaging or head portion 30 of the other pawl and acts as a dragging connection between the pawl and the plate 24 as well as a guide to keep the pawls in position. The pawls operate in a slideway 31 formed by the rearwardly projecting annular segments 32, 33 of the pawl drive plate 24. It will be understood that the pawls loosely embrace the drive plate 24 and have sufficient clearance with respect thereto such that they can move radially outwardly under the influence of centrifugal force. This movement is limited in both directions by engagement of the inner surface of the pawls with the hub portion 16 as will be understood.

The springs 28 may be of any desired strength to produce the operating characteristics desired, it being understood that the springs will keep the pawls in the illustrated retracted position until a predetermined speed of the shaft 12 is reached, whereupon the centrifugal force will overcome the force of the springs and the pawls will tend to move radially outwardly as will be explained below.

The runner hub 16 has a slight baffle 34 for reducing the efficiency of the coupling at idling speed and for preventing surges and is also formed with a forwardly projecting annular portion 35 provided with circumferentially spaced pawl receiving openings or notches 36. Four notches are shown but more may be required in some installations just as more than two pawls may be required for smooth operation.

The notches 36 are shown radially aligned with the pawls 25 such that the pawls may engage the notches to lock the drive plate 24 to the runner hub 16. The pawls 25 are formed with an outer cammed surface 37 which is shaped such that when the pawls are urged outwardly by centrifugal force and the notched member 35 of the runner 16 is rotated at a different speed than the plate 24, the surface 37 will engage the edge 38 of the notches 36 and cam the pawls inwardly until the speeds of the two members are substantially equal whereupon the pawls will enter the notches.

Each of the pawls is provided with three detent holes 39 which are adapted to receive a spring urged ball detent 40 carried by the drive plate 24. The detents prevent hunting of the pawls and tend to hold the pawls in one of three positions while the plate 24 is rotating within the respective desired speed ranges.

Each pawl is provided with an inner tooth 41 which is adapted to engage openings, slots or recesses 42 formed in the runner hub 16 and similar openings 43 in the portion 22 of the impeller hub 11. The inner teeth 41 of the pawls are preferably of stepped construction so that upon inward radial movement thereof the slots 42 in the runner hub will be engaged prior to the slots 43 in the annular portion 22 of the impeller hub 11. Otherwise, there might be instances when the teeth 41 would not engage both the runner and impeller hubs as soon as desired because the runner and engine might not come to rest at the same time and with the slots 42, 43 align axially. The stepped teeth 41 facilitate the clutching action but the teeth may be made without the step if desired. The teeth 41 are cammed so that they will smoothly engage the respective openings 42, 43 when the pawls are rotating in synchronism with the runner hub 16 and the impeller hub 11 or both as the case may be. Should the pawls 25 be urged outwardly by centrifugal force or inwardly by the springs 28 at times when the parts to be engaged are not rotating synchronously, the cammed outer ends of the pawls will engage the edges of the respective openings and the pawls will be prevented from engaging the openings until the pawls reach synchronism.

The operation of the device so far described is as follows. Let it be assumed that the parts are in the position illustrated with the vehicle engine, the hub 16, and the shaft 21 at rest. The engine may be started by pushing or towing the car and the engine compression may be used for braking on grades by coasting with a dead engine under these conditions because the impeller and runner are directly connected through the pawl teeth 41.

When the engine is started the pawls 25 will disengage themselves from the hub portions 16 and 22 at approximately 325 R. P. M. The retracting springs 28 and the detent springs 44 are preferably chosen such that centrifugal force on the pawls will effect their outward movement to mid position at an engine speed of between 250 and 400 R. P. M., the engine idling speed with a warm engine being about 425 R. P. M. It is assumed that a vehicle clutch (not shown) or other equivalent disengaging means located between the runner 15 and the drive wheels will be disengaged when the engine is started or the transmission is in neutral. In such case, the frictional load on the pawl teeth 41 will not be great and the pawls will disengage without difficulty.

When the pawls have moved to mid position the detent ball 40 engages the center hole 39 in the pawl 25 and the impeller 10 and runner 15 are free for normal operation. The vehicle may then be started, accelerated, maneuvered, etc., with the coupling elements slipping relative to each other.

When the vehicle has been accelerated to the predetermined cruising speed, for example, about 25 M. P. H. the pawls 25 under the influence of centrifugal force, tend to move outwardly to engage the openings 36. They will be prevented from engaging the openings, however, so long as the speeds of the pawls and the hub 16 are different as they normally will be because of the slip in the coupling. The driver can effect engagement of the pawls by momentarily releasing the throttle whereupon the impeller will drop in speed relative to the runner and the pawls will engage at the instant of synchronism.

From the description it will be apparent that the pawls acting under the influence of centrifugal force when the engine is accelerated, will overcome the ball detent 40 and become disengaged from the openings 42, 43. As the speed of the engine is increased the pawls continue their outward movement for engagement with the notches 36 of the hub 16.

As a means to positively block the movement of the pawls from mid position under asynchronous conditions, I provide a blocking or balking member in the form of an open ring 45 carried by an annular flange 46 on the hub 16 in frictional drive relationship therewith. The ring 45 has opposite pairs of outwardly projecting legs 47, 48 and 49, 50 respectively, the former forming extensions of the free ends of the ring. The leg portions give the ring the general appearance of a double ended yoke. The leg portions 47, 49 are provided with circumferential projections 51 and the leg portions 48, 50 with projections 52. The projections 51, 52 are adapted to be received in the opposite ends respectively of circumferential openings or slots 53 in the pawls 25 when the pawls are moved radially outward a distance to cause disengagement of the inner teeth 41 from the openings 42 and 43. This disengagement of the teeth 41 permits relative rotation between the impeller 10 and the runner 15 known as "slippage" thereby causing the diametrically opposite projections 52 to interlock with the ends of the slots 48 and block further outward movement of the pawls.

When the driver has reached a satisfactory car speed he releases the throttle control momentarily which causes a drop in speed of the impeller 10 and of the drive plate 24 relative to the runner hub 16 which carries the slotted integral annular portion 35. When the speed of the impeller and its associated part drops to the speed of the runner 16, the frictional contact between the latter and the balk ring 45 will effect slight rotation of the ring in the direction of rotation thereby withdrawing the projections 52 from the openings 48 and permitting the pawls to move outwardly by the action of centrifugal force into engagement with the notches 36 before the projections 51 can effect engagement with the pawls the projections 51, 52 being spaced sufficiently for this purpose and the speeds of the impeller and runner being in synchronism at this instant as above described.

The impeller and runner are now locked for conjoint operation without slippage so long as the impeller tends to overrun the runner as is the case during normal driving of the car by the engine. When the car tends to drive the engine above the aforesaid pawl cut in speed, the runner 15 will overrun the impeller 10 and there will be slippage therebetween due to the roller clutch 23 which acts as a one-way driving connection between the impeller and the pawl drive plate 24.

When the vehicle speed is reduced, the pawls 25 will drop out of the openings 36 at some speed below 25 M. P. H. depending upon the strength of the detent springs 44 and the frictional load on the pawls which will be less when the vehicle is coasting than when the engine is driving due to the roller clutch 23. The runner 15 and the ring 45 through its frictional drive connection are now rotating at a greater speed than the impeller 10 thereby causing the projections 51 to engage the openings 53 as the pawls are moved inwardly. This engagement holds the pawls against further inward movement preventing the teeth 41 from entering the openings 42, 43 thus preventing a positive lockup between the impeller and the runner. This condition continues so long as the runner overruns the impeller. When the vehicle has stopped and the engine is idling, the balking ring 45 continues to rotate in a counterclockwise direction (as viewed in Fig. 2) under drive by the pawls 25 the frictional drag of the hub portion 16 on the ring effecting disengagement of the projections 51 from the openings 53 and engaging the projections 52 therein. When the engine has stopped the projections 52 may continue in the openings 53 and the pawls 25 remain locked against inward movement for engagement of the teeth 41 with the slots 42 but as soon as there is any relative movement between the hubs 11 and 16 as would be the case in towing or pushing the vehicle with the engine stopped, the balk ring 45 would by its frictional engagement with the hub 16 be moved counterclockwise thereby disengaging the projections 52 from openings 53 to permit the pawls to move inwardly locking the teeth 41 in the openings 42 and 43. The impeller 10 and runner 15 are then directly locked so that the engine may be started by towing or pushing the vehicle.

The form of the device illustrated in Figs. 4 and 5 embodies the same construction as illustrated in Figs. 1 and 2 except that the overrunning rollers 23, lockup teeth 41, and spring-pressed ball 40 have been omitted and the pawls are driven directly with the impeller hub because of the lockup between the pawl plate 24 and impeller hub 11 effected by the pins 55. The operation of the pawls 25 and balk ring 38 are the same but there is no freewheeling when the pawls 25 are in the openings 36 as would be in the forms shown in Figs. 1 and 2.

It will thus be understood that I have provided simple and desirable constructions for retaining the pawls of a centrifugal clutch in a predetermined position until certain vehicle operating conditions have been obtained in response to which such control means may release the pawls for engagement.

Although the particular structures herein described are well adapted for carrying out the objects of the invention it will be understood that various modifications, changes and substitutions may be made without departing from the spirit thereof, for example, various changes may be made in the size, shape, and arrangement of the parts by those skilled in the art. The present invention is, therefore, to be construed to include all such modifications, changes and substitutions.

I claim:

1. A power transmitting clutch mechanism comprising a driving member, a driven member, a centrifugally responsive pawl carried by one of said members, radially aligned openings in said other member for receiving said pawl at a relatively slow and a relatively fast rotative speed respectively of said one member and substantially synchronous rotation of said members, and rotatable means in frictional driving connection with said other member movable into blocking relationship relative to said pawl at predetermined rotative speed of said one member intermediate said slow and fast speeds for preventing engagement of said pawl at said fast speed of said one member during asynchronous rotation of said members.

2. A power transmitting clutch mechanism comprising a driving member, a centrifugally responsive pawl carried by said driving member, said pawl having a head including a body portion and a clutching tip, an annular portion on said driven member surrounding said pawl, an opening in said annular portion adapted to receive said pawl tip at predetermined speed of said driving member and substantially synchronous rotation of said members for establishing a positive drive between said members, an open ring frictionally journalled on said driven member within said annular portion, the open ends of said ring being formed with outwardly extending leg portions, lateral projections on said leg portions in the plane thereof and a recess in said body portion of said pawl head for receiving said lateral projections for preventing engagement of said pawl with said opening during asynchronous rotation of said members, said lateral projections being spaced apart sufficiently to provide lost motion between said pawl and said ring.

3. A power transmitting clutch mechanism comprising a rotatable pawl carrying core, a rotatable shell member having a pawl receiving recess therein, a pawl carried by said core and movably responsive to centrifugal force upon rotation of said core to engage said recess for establishinging a positive drive between said core and shell and means for preventing engagement of said pawl during asynchronous rotation of said core and shell comprising an open ring having frictional drive connection with said shell member, an outwardly extending finger on one open end of said ring, a circumferentially directed projection on said finger and a circumferentially directed slot in said pawl for engageably receiving said projection, the ends of said ring being spaced apart sufficiently to permit relative oscillation between said pawl and projection before the latter enters into engagement with said slot and while the pawl is unrestrained by said ring.

4. A power transmitting clutch mechanism comprising a driving member, a driven member, a centrifugally responsive pawl carried by one of said members, said pawl having a head including a body portion and a clutching tip; a recess on said other member for receiving said pawl tip at predetermined speed and substantially synchronous rotation of said members to establish a positive drive between said members, a slot in the body of said pawl head and a rotatable open ring in constant frictional drive relationship with said other member, said ring having a pair of adjacent leg portions spaced apart a distance greater than the width of the pawl head body portion in the plane of said ring and said leg portions being provided with tooth-like projections engageable in said slot for preventing engagement of said pawl with said other member during asynchronous rotation of said members.

5. A power transmitting clutch mechanism as claimed in claim 4 wherein the adjacent leg portions form continuations of the open ends of the ring and wherein said projections are lateral projections of the leg portions.

6. A power transmitting clutch mechanism as claimed in claim 4 wherein said ring has a second pair of leg portions diametrically opposite the first mentioned pair.

7. A power transmitting clutch mechanism comprising a driving member, a driven member, a centrifugally responsive pawl carried by said driving member, said pawl having a head including a body portion and a clutching tip, an annular portion on said driven member, an opening in said annular portion engageable by said pawl tip at predetermined speed of said driving member and substantially synchronous rotation of said members for establishing a positive drive between said members, a pawl balking member having an annular-like portion in constant frictional drive connection with said driven member and having a pair of spaced-apart leg portions extending outwardly away from said annular portion of said balking member, said pawl body portion and each of said leg portions having cooperable interengageable tooth and slot portions interengageable for preventing engagement of said pawl tip with said opening during asynchronous rotation of said members, said leg portions being spaced apart sufficiently to permit lost motion between said pawl and balking member before either cooperable tooth and slot portions may enter into interengagement and while the other cooperable tooth and slot portions are still disengaged.

8. A power transmitting clutch mechanism comprising a driving member, a driven member, a centrifugally responsive pawl carried by said driving member, said pawl having a head including a body portion and a clutching tip, an annular portion on said driven member surrounding said pawl, an opening in said annular portion adapted to receive said pawl tip at predetermined speed of said driving member and substantially synchronous rotation of said members for establishing a positive drive between said members, a ring having a portion frictionally journalled on said driven member within said annular portion, and having adjacent leg portions extending outwardly away from said journalled portion, said leg portions including tooth-like elements adapted for interengagement with said body portion of said pawl head for preventing engagement of said pawl tip with said opening during asynchronous rotation of said member, said elements being spaced apart sufficiently to provide lost motion between said pawl and said ring.

EDWIN R. MAURER.

REFERENCES CITED

The following references are of record in the file of this patent:

UNITED STATES PATENTS

| Number | Name | Date |
|---|---|---|
| 2,179,927 | Fishburn | Nov. 14, 1939 |
| 2,194,787 | Dunn | Mar. 26, 1940 |
| 2,210,668 | Hopkins | Aug. 6, 1940 |
| 2,278,623 | Orr | Apr. 7, 1942 |
| 2,448,539 | Maurer | Sept. 7, 1948 |